United States Patent [19]

Lagemann et al.

[11] Patent Number: 5,501,894

[45] Date of Patent: Mar. 26, 1996

[54] FABRIC FOR STRENGTHENING AND/OR REINFORCING FLAT-SHAPED ARTICLES

[75] Inventors: Bernd Lagemann, Tiengen; Friedrich Mathias, Erzingen, both of Germany

[73] Assignee: Synteen Gewebe Technik GmbH, Klettgau-Erzingen, Germany

[21] Appl. No.: 225,568

[22] Filed: Apr. 11, 1994

[30]  Foreign Application Priority Data

May 19, 1993 [DE]  Germany .............................. 9307658 U

[51] Int. Cl.⁶ ..................................................... B32B 7/00
[52] U.S. Cl. ............................. 428/57; 428/58; 428/157; 428/192; 428/193; 428/213; 428/253; 428/902
[58] Field of Search ....................................... 428/192, 193, 428/157, 213, 57, 58, 253, 902

[56]  References Cited

U.S. PATENT DOCUMENTS 4,698,276  10/1987  Duval ....................................... 428/193

*Primary Examiner*—James J. Bell
*Attorney, Agent, or Firm*—Bachman & LaPointe

[57]  ABSTRACT

A fabric for strengthening flat-shaped articles consisting of warp threads and woof threads which form a basic fabric having a connected edge area which is thinned relative to the basic fabric.

10 Claims, 2 Drawing Sheets

FABRIC FOR STRENGTHENING AND/OR REINFORCING FLAT-SHAPED ARTICLES

The invention concerns a fabric for strengthening and/or reinforcing flat-shaped articles, in particular plaster-coated structures or the like, consisting of warp threads and woof threads which form a basic fabric and a connected edge area.

Mesh fabric in different forms and designs are used for strengthening and/or reinforcing flat-shaped articles. In particular, this is the case in high buildings or below ground structures or in the case of road building. Fabrics of this type also are used for strengthening, for example, slopes on roads. In this case the term fabric is to be understood as meaning all flat-shaped articles which are produced by weaving, knitting, raschel warp knitting, or the like, or exist as laid material, fleece, et cetera.

These fabrics are laid in strips, either the fabrics overlapping or being butted together. Overlapping has the disadvantage that in the area of the overlapping there is a ridge which in many cases causes problems. For example, in the case of plaster-coated structures overlapping does not ensure an effective mesh opening width for embedding in the plaster. A ridge which makes it difficult to level an applied plaster layer is produced at the point of overlapping. Further, the thicker plaster layer also increases the use of plaster material.

If fabrics of this type are inserted into a plaster layer structure as a reinforcing fabric, as a rule this is done by butting the layers together. In order to prevent propagation of crack formation into the plaster layer at the joints, these reinforcing fabrics also are additionally covered with a fine mesh fabric. This produces a plaster layer structure with higher resistance to impact, which forms a protection against damage, such as, for example, in the foundation area of buildings, in entry halls of department stores, supermarkets, schools, or the like. The additional fine mesh fabric here makes the plaster coated structure significantly more expensive.

The task of the present invention is to create a fabric of the above-mentioned type which may be laid in courses as before, but after it is laid having a sufficient resistance to mechanical influences without additional fine mesh fabric.

In order to solve this task the edge area is made thin in comparison with the basic fabric.

Thus, this fabric is made intentionally with an edge area which, considered by itself, possibly would not possess sufficient resistance against mechanical influences. However, in the case of laying fabric courses of this type the edge areas of two adjacent courses overlap so that the edge areas are connected together in order to provide sufficient resistance. However, the edge area is to be kept thin so that the thickness of the entire area is not or is only insignificantly greater than that of the basic fabric when the two edges are added together.

Preferably, the edge areas are marked on the upper side of the fabric, which is helpful for laying them. The distance between the markings corresponds to the thread separation. The markings have to ensure overlapping of holes.

The edge area may be thinned in different ways. One concept is to choose warp threads with a smaller cross-section to be used in the edge area.

Another possibility in particular consists in using fiber bundles as the warp and/or woof threads in the main fabric. The thread bundles in the edge area here are broken up so that only a few threads or only one thread is present in the edge area as a warp or woof thread. For example, the thread bundles may be broken up so that in the case of a woof thread the length thereof is limited. In particular, this is the case when the woof is introduced with air as in the case of air nozzle weaving machines. However, the woof thread also could be cut off in the edge area, that is, the woof floats in the edge area. For the warp threads in the edge area the thinning is simpler, since here instead of two, three, or more threads, as in the case of the main fabric, only one or two threads are chosen.

In order to strengthen the edge area additionally, it is also possible for the edge area to be made with threads or thread bundles of a different material which has a higher strength than that of the fibers of the main fabric. For example, if the main fabric consists of polyester threads, aramid threads, steel threads, or the like may be used for the edge area. There are many possibilities left open here and they are to be covered by the present invention.

The advantage of the present invention thus consists in the fact that thinning the edge area provides an area of overlapping between two adjacent courses which both considerably reduces the work expenditure as well as the material use and represents an economical alternative to conventional processes. The structure (binding technique), material use, and mixtures (raw material/yarns), as well as the width of the overlapping area may be matched to the corresponding requirements. The desired formation of the area of overlapping is achieved by means of a precisely measured thinning of the fiber bundles in the edge area in the longitudinal and/or in the transverse direction of the fiber as well as in a previously set width.

In practice at least the edge area of the fabric has to be stabilized. Stabilization prevents the threads from slipping out of place together, and, as a rule, is produced by means of plastic, starch, glue, et cetera. Stabilization must be chosen so that subsequent application to the flat-shaped item is possible. Therefore, in the case of application to plaster-coated structures, stabilization must be performed so that delamination between fabric and plaster applied does not occur. Therefore the stabilization must be matched to mineral or plastic bonded plasters. This is performed by modifying the stabilization.

If a fabric of this type is used in a plaster layer structure, the overlapping prevents crack formation and it is not necessary to use a second fabric. There are no longer any joints.

A fabric in accordance with the invention also may be produced by first making a fabric course with a thinned width of the desired fabric. A thinned area in accordance with the invention is present not only in the edge area of this fabric course, but also in the area of the width of the desired fabric. After producing this fabric course, the fabric course may be cut longitudinally in the width of the desired fabric so that a thinned area in the fabric course is cut through. This again forms a fabric, the edge region of which preferably is thinned on both sides.

Further advantages, features, and details of the invention are given in the following description of preferred specific embodiments, as well as by means of the drawings; here FIG. 1 shows a cross-section of a state-of-the-art plaster layer structure;

Figure 1:
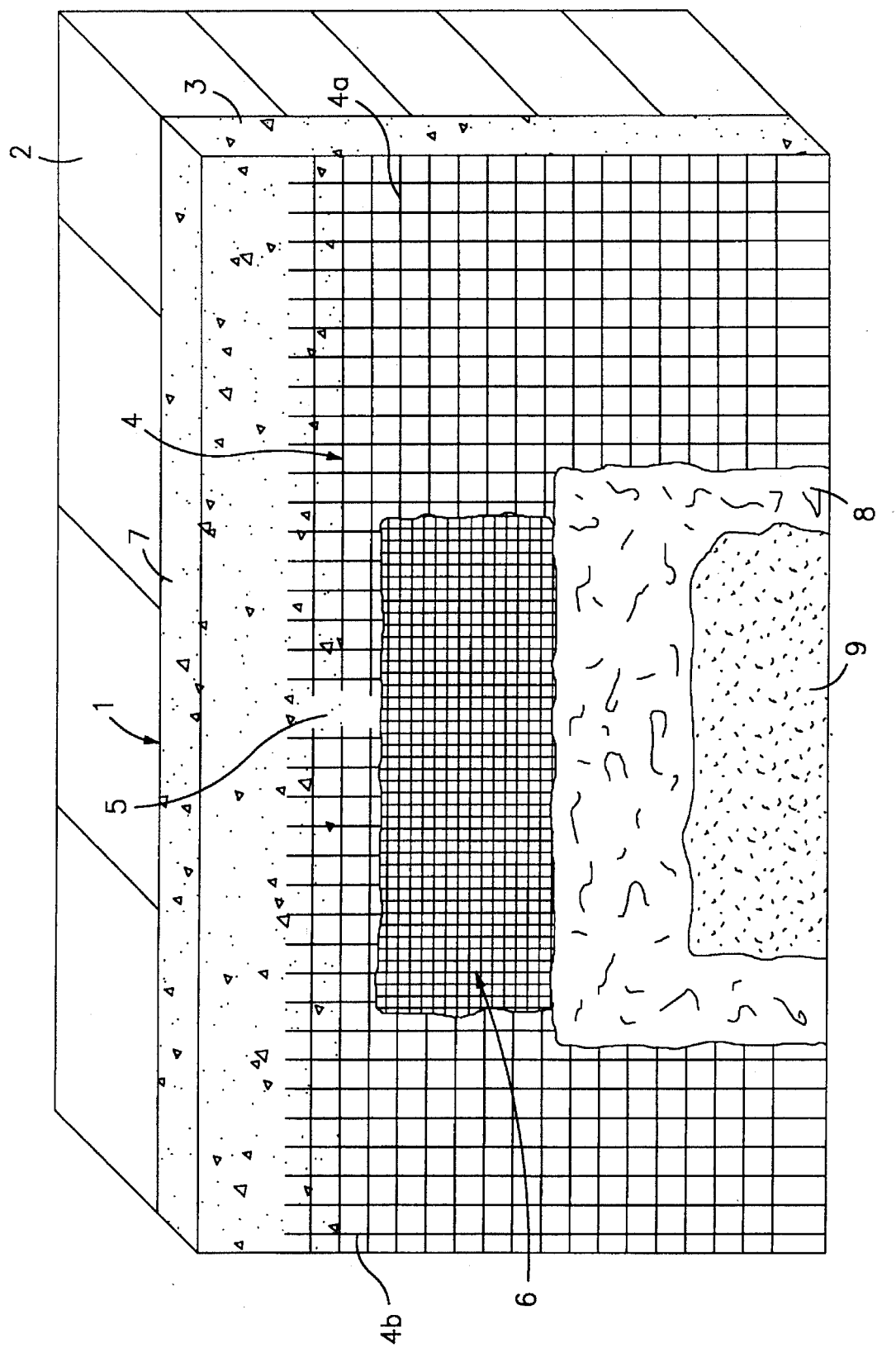

In the case of a conventional plaster layer structure 1 on a masonry 2 a reinforcing fabric 4 is laid onto an insulation layer 3, for example consisting of styropore plates. A basic plaster 7 is applied onto the insulation layer 3 and a reinforcing fabric is laid in this basic plaster 7. In this case the reinforcing fabric 4 consists of fabric courses 4a and 4b butted together 5. The reinforcing fabric 4 then is entirely covered by means of a fine mesh fabric 6, which, in particular, overlaps the joint 5.

The mesh fabric 6 is followed by the application of a further basic plaster layer 8, which then is covered with a visible layer of plaster 9.

Figure 2:
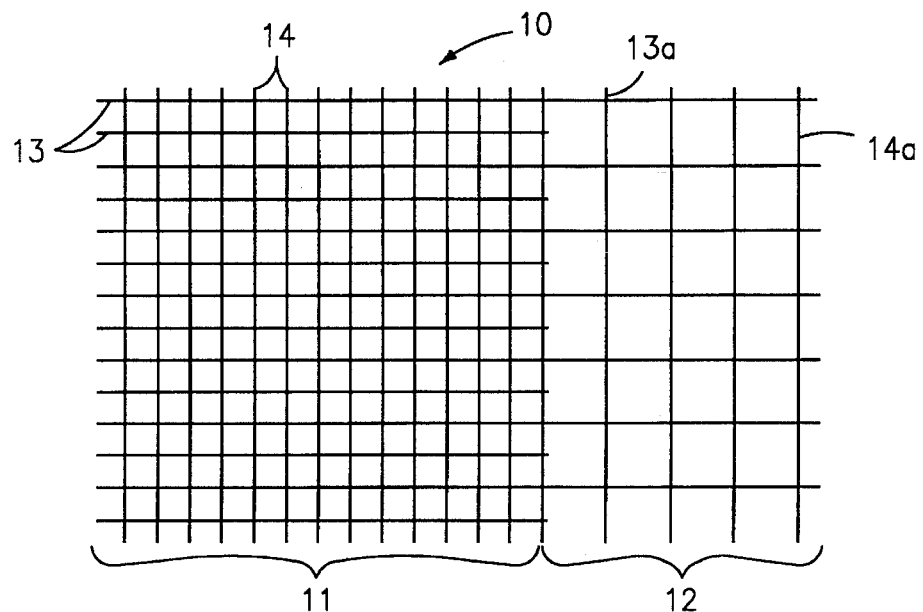
FIG. 2 shows a top view of a fabric for strengthening and/or reinforcing plaster layers in accordance with the invention.

FIG. 2 shows a reinforcing fabric 10 in accordance with the invention, consisting of a basic fabric 11 and an edge area 12. This edge area 12 forms an overlapping area which is made so that two adjacent reinforcing fabric courses may overlap in this edge area 12 without producing a disturbing ridge.

Usually both woof threads 13 as well as ward threads 14 consist of thread bundles or thick threads. The fabrics 11 retain these fiber bundles. On the other hand, in the edge area 12 both the woof threads as well as the ward threads are thinned by approximately one-half, which may be produced by choosing thinner warp threads or, in the second place, by using fewer threads for the woof threads and the warp threads. This may go so far that in the edge area 12, as is shown in FIG. 2, only one woof thread 13a and one warp thread 14a are used.

Figure 3:
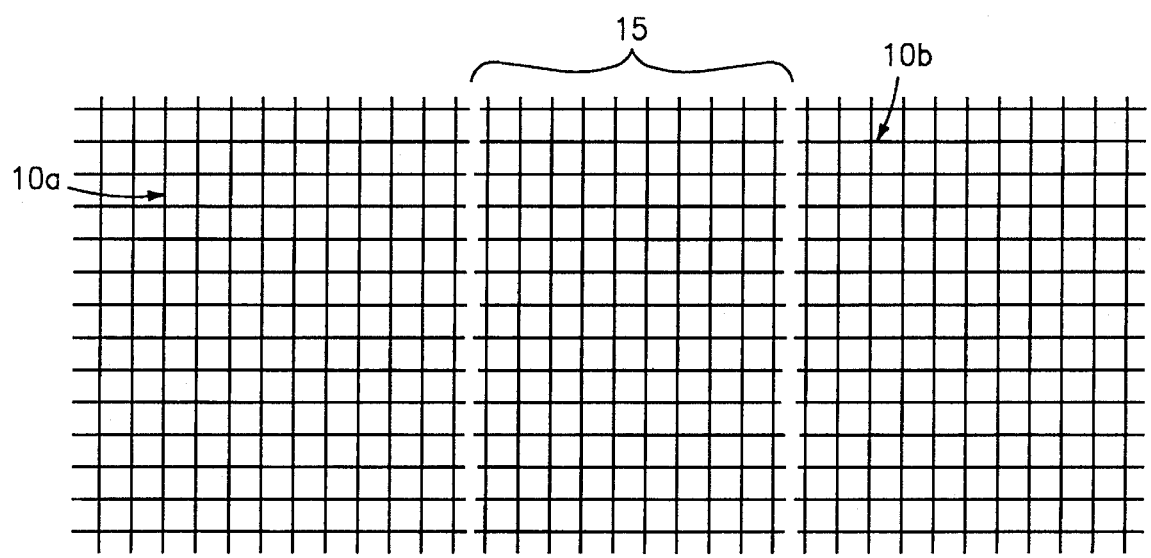
FIG. 3 shows a cross-section of two overlapping fabrics for strengthening and/or reinforcing plaster layers.

FIG. 3 shows an overlapping area 15 between two reinforcing fabric courses 10a and 10b. It may be seen that this overlapping area 15 agrees with the basic fabric 11 and barely covers it.

We claim:

1. A fabric for strengthening and/or reinforcing flat-shaped articles, in particular of plastered structures (1) or the like, consisting of ward threads (14) and woof threads (13), which form a basic fabric (11) and a connected edge area (12), characterized by the fact, that the edge area (12) is thinned in relation to the basic fabric (11).

2. A fabric in accordance with claim 1, characterized by the fact that the thinning is made by selecting thinner threads (13, 14) for the edge area (12).

3. A fabric in accordance with claims 1, characterized by the fact that the thinning is produced by eliminating threads in the edge area (12).

4. A fabric in accordance with claim 1, characterized by the fact that the edge area (12) uses a thread or thread bundle from a different material from that in the basic material (11).

5. A fabric in accordance with claim 1, characterized by the fact that the edge area (12) is thinned by approximately one-half the width of the basic fabric (11).

6. A fabric in accordance with claim 1, characterized by the fact that two edge areas of two adjacent fabric courses together form an overlapping area.

7. A fabric in accordance with claim 1, characterized by the fact that warp and/or woof threads (13, 14) are produced from synthetic fiber materials, yarns, glass fiber, carbon fiber, or ceramic fiber, as well as mixtures and combinations thereof.

8. A fabric in accordance with claim 1, characterized by the fact that the warp and woof threads (14, 13) are stabilized at least in the edge area (12).

9. A fabric in accordance with claim 8, characterized by the fact that the stabilization is produced with plastic, starch, glue, or the like.

10. A fabric in accordance with claim 9, characterized by the fact that the stabilization is matched to the material of the flat-shaped article (1).

* * * * *

UNITED STATES PATENT AND TRADEMARK OFFICE
CERTIFICATE OF CORRECTION

PATENT NO.  : 5,501,894
DATED       : March 26, 1996
INVENTOR(S) : Bernd Lagemann et al.

It is certified that error appears in the above-indentified patent and that said Letters Patent is hereby corrected as shown below:

Title page, Item No. [30] Foreign Application Priority Data, delete the German application number "9307658" and insert the correct priority application number --9307660.6--.

All of the claims in the patent, claims 1-12, should be replaced by the correct claims 1-10 as follows:

1. A fabric for strengthening and reinforcing flat-shaped articles, in particular of plastered structures, consisting of warp threads and woof threads, which form a basic fabric and a connected edge area, the improvement comprising:
   the edge area is thinned in relation to the basic fabric.

2. A fabric according to claim 1 wherein the edge area is formed of thinner threads.

3. A fabric according to claim 1 wherein the edge area is formed of fewer threads.

4. A fabric according to claim 1 wherein the edge area contains a thread of different material from that of the basic fabric.

5. A fabric according to claim 1 wherein the thinned edge area is about one-half the width of the basic fabric.

6. A fabric according to claim 1 wherein two edge areas of two adjacent fabric courses together form an overlapping area.

7. A fabric according to claim 1 wherein at least one of the warp and woof threads is formed of a material selected from the group consisting of synthetic fiber materials, yarns, glass fiber, carbon fiber, ceramic fiber, and mixtures thereof.

cont'd on 2nd page.

UNITED STATES PATENT AND TRADEMARK OFFICE
CERTIFICATE OF CORRECTION

PATENT NO. : 5,501,894
DATED : March 26, 1996
INVENTOR(S) : Bernd Lagemann et al.

It is certified that error appears in the above-indentified patent and that said Letters Patent is hereby corrected as shown below:

8. A fabric according to claim 1 wherein the warp and woof threads are stabilized in at least the edge area.

9. A fabric according to claim 1 wherein the threads are stabilized with a material selected from the group consisting of plastic, starch, glue, and mixtures thereof.

10. A fabric according to claim 1 wherein the material used for the stabilization is matched to the material from which the flat-shaped article is formed.

Signed and Sealed this

Seventeenth Day of September, 1996

Attest:

BRUCE LEHMAN

*Attesting Officer*  *Commissioner of Patents and Trademarks*